United States Patent [19]

Hutchison

[11] 4,186,545

[45] Feb. 5, 1980

[54] CLUTCH-BRAKE MECHANISM

[76] Inventor: Marion E. Hutchison, 1241 Ackermant, Waterloo, Iowa 50703

[21] Appl. No.: 854,773

[22] Filed: Nov. 25, 1977

[51] Int. Cl.² ............................................. A01D 69/08
[52] U.S. Cl. ...................................... 56/113; 56/116; 56/118; 192/11
[58] Field of Search .................... 56/11.3, 11.6, 11.7, 56/11.8; 192/11, 12 R, 17 R

[56] References Cited

U.S. PATENT DOCUMENTS

| 2,960,810 | 11/1960 | Musgrave | 56/11.3 |
|---|---|---|---|
| 3,943,785 | 3/1976 | Percifield | 56/11.6 |
| 4,037,389 | 7/1977 | Harkness | 56/11.3 |
| 4,048,787 | 9/1977 | Harkness et al. | 56/11.3 |

*Primary Examiner*—Jay N. Eskovitz
*Attorney, Agent, or Firm*—Henderson & Sturm

[57] ABSTRACT

A clutch mechanism for a lawn mower which automatically prevents transmission of the rotary force of the drive shaft of a lawn mower when a lawn mower operator is not holding on to a control structure and which invention further includes the provision of a braking mechanism which stops rotation of a lawn mower blade when such control structure is not being held and when the clutch is disengaged.

4 Claims, 3 Drawing Figures

CLUTCH-BRAKE MECHANISM

BACKGROUND OF THE INVENTION

For a number of years there has been a growing appreciation of the danger and other disadvantages of the common practice of fixing a rotary mower blade directly on the depending drive shaft of an engine. U.S. Pat. No. 3,026,665 for example, points out that such direct drive causes engine shafts to be bent when the blade strikes an obstruction, that overloading the direct-driven blade stalls the engine, with resulting inconvenience, and that that direct drive endangers the operator and others because the blade always rotates with the engine, even during starting and idling. The seriousness of this latter danger now appears to be leading to government safety requirements for a "deadman" lever on the mower handle which will stop the blade except when the operator is in operating position and holding the lever. To be effective, a deadman control requires high reliability, and if its use is not to impose undue cost on the consumer, a highly practical, effective, and inexpensive mounting and control arrangement is required. Consequently, there is a need to provide such a blade mounting and control arrangement which can be applied to various presently-designed mowers with a minimum of change and expense.

Certain structures have been designed with the intent to de-clutch and decelerate a lawn mower blade which is co-axially mounted to the shaft of an internal combustion engine. One approach taken, however, has been to utilize a centrifugal clutch for example of the type shown in U.S. Pat. No. 4,035,994. To the outside of such clutch drum is mounted a hand brake which is applied by spring tension and released by operator actuation of the deadman control which also simultaneously causes an increase in engine speed and thus causes the clutch to be engaged.

The problem with a centrifugal clutch approach to this problem is that it tends to be self applying and in that sense is not a fail safe device. For example, if the spring that is to apply the brake were to either break or lose tension, the operator might release the deadman control and have the blade continue to drive from the engine. The operator could be unaware that the blade had failed to stop.

Power lawn mowers are manufactured and distributed in very large numbers in the consumer market. Maintenance must be considered uncertain, at best. It is a statistical certainty that substantial numbers of mowers will be operated by the public with mechanical defects. It is therefore obvious that a clutch-brake mechanism which is intended as a safety device should be so designed that a mechanical defect in any component of the mechanism will tend to result in the blade being disconnected from the engine, rather than the reverse. It is believed by many that a safety control that is not fail-safe in operation is worse than no control at all.

SUMMARY OF THE INVENTION

A clutch mechanism attached to a lawn mower is provided with an actuating mechanism which prevents transmission of a rotary force from a lawn mower engine to a lawn mower blade unless the operator of the lawn mower is holding on to a control mechanism. A first circular member is rigidly attached to the drive shaft and a second circular member is rotatably journeled to the first circular member. A mower blade is rigidly attached to the second circular member and a mechanism is provided for selectively frictionally engaging the first and second circular members in a first position thereof for substantially preventing rotation of one of the circular members with respect to the other and this mechanism is movable to a second position for allowing the circular members to rotate with respect to each other.

A further aspect of this invention relates to a brake mechanism for stopping rotation of a lawn mower blade when the clutch mechanism referred to above is disengaged.

An object of the present invention is to provide an improved safety device for lawn mowers.

Another object of the invention is to provide a clutch mechanism for a lawn mower which is economical to produce, simple to install, adaptable to existing lawn mower structures and is nevertheless extremely dependable in operation.

A further object of the invention is to provide a fail-safe mechanism which prevents rotation of a lawn mower blade unless a control mechanism is constantly held by the operator of the lawn mower.

Other objects, advantages and novel features of the present invention will become apparent from the following detailed description of the invention when considered in conjunction with the accompanying drawings.

DESCRIPTION OF THE PREFERRED EMBODIMENTS

Figure 1:
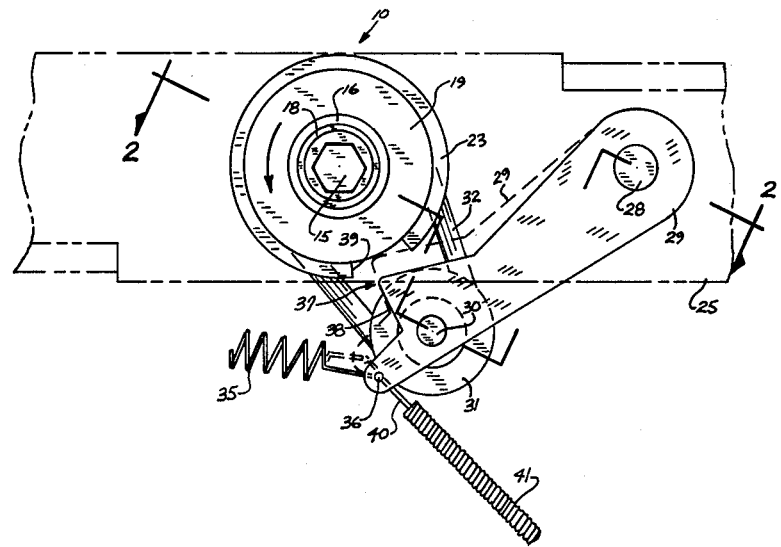
Figure 2:
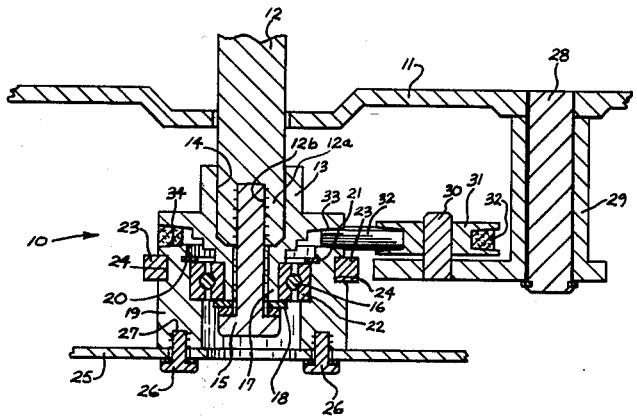

Referring now to the drawings wherein like reference numerals designate identical or corresponding parts throughout the several views, FIGS. 1 and 2 show a clutch brake mechanism 10 constructed in accordance with the present invention.

A lawn mower (not shown) of a type having an engine base 11 and an output drive shaft 12 is shown in FIG. 2 and has a first circular drive hub member 13 rigidly attached to the drive shaft 12. This rigid connection can be made in any of a number of known ways, but in this preferred embodiment it is accomplished by having a non-circular end 12a which extends into a complementarily-shaped opening 14 in the circular drive hub member 13. A bolt 15 is threadably engaged into an opening 12b in the end 12a of the drive shaft 12.

A bearing 16 is also held in place around portion 17 of member 13 by means of the bolt 15 and a washer 18.

The circular blade of member 19 is rotatably attached to the circular drive hub member 13 by means of a bearing 16, which is held in place with respect to the member 19 by a clip member 20 disposed in the groove 21 and a shoulder 22 on the inner periphery of the member 19.

An arcuate member 23 is frictionally received in an annular groove 24 which extends around the member 19. This frictional member 23 extends around more than 180° but less than 360° and serves as part of a brake mechanism as will be explained below.

Also attached to the member 19 is a lawn mower blade 25 which is held in place by a pair of bolts 26 which are threadably received within bores 27 in the member 19, but of course other fastener means could be used to secure the blade 25 to the member 19.

Referring now specifically to the clutch portion of the embodiment of FIGS. 1 and 2, it is noted that a peg 28 extends downwardly from the base 11 and is rigidly attached thereto. A control arm 29 is pivotally mounted to the peg 28. A cylindrical member 30 is rigidly attached to the control arm 29 and an idler pulley 31 is rotatably attached to the member 30. A belt 32 extends around the idler pulley 31 and is complementarily shaped with respect to surfaces 33 on the member 13 and 34 on the member 19.

Referring more specifically to FIG. 1, it is noted that a tension spring 35 is attached through a hole 36 to the end of the arm 29 and this spring 35 is then attached to the lawn mower for example to the base 11. This tension spring 35 tends to bias the arm 29 to the position shown in dashed lines in FIG. 1 and in this position the idler pulley 31 is moved so as to relieve the tension on the belt 32. Accordingly, there is not enough frictional contact between the belt 32 and the surfaces 33 and 34 on the members 13 and 19 respectively to cause them to rotate together when the belt tension is relieved. Consequently, while the engine 12 continues to rotate, this rotary motion will not be transmitted to the blade 25.

Also, when the arm 29 moves to the position to which it is biased, as shown in dashed lines in FIG. 2, a projection 37 having a flat surface 38 thereon comes in contact with one end 39 of the friction ring 23. When such contact is made between the portion 37 and the surface 39 of the member 23, this serves as a friction brake to stop the rotation of the member 19 and therefore the rotation of the blade 25.

The present invention is designed such that it would normally be in the position shown in dashed lines in FIG. 1 and therefore the clutch 10 would be disengaged and the braking mechanism would be functioning so that the blade would not be rotating even though the engine on the lawn mower would be running and the drive shaft 12 would be rotating. When it is desired to use the lawn mower and cause the blade 25 to rotate so as to cut grass or the like, a control cable 40 attached to one end of the control arm 29 would be used to pull the arm 29 to the position shown in solid lines in FIG. 1. This cable 40 extends through a sheathe structure 41 and the cable 40 and sheathe structure 41 would normally lead to the control portion (not shown) of the lawn mower. Consequently, when the cable 40 is pulled such as by use of a lever (not shown) attached to the other end thereof, then the idler pulley 31 would be pulled radially outwardly with respect to the clutch mechanism 10 so that the belt 32 would securely engage the surfaces 33 and 34 on the circular members 13 and 19 respectively and thereby will cause these members 13 and 19 to rotate together. Additionally, the portion 37 of the arm 29 would be spaced from the friction ring 23 so that no braking would occur as long as the arm 29 is maintained in that position.

Accordingly, it is clear that this embodiment does indeed accomplish the objects set forth above and does provide a fail safe mechanism for a lawn mower. In other words, it is only when the operator of the lawn mower causes the cable 40 to pull on the control arm 29 that the lawn mower blade 25 rotates. Should the lawn mower operator let go of the control for the cable 40, then the spring 35 automatically moves the control arm 29 to the position shown in dashed lines in FIG. 1 which, as explained above, not only prevents transmission of the rotary motion of the drive shaft 12 to the blade, but also engages the brake by the contact of the portion 37 of arm 29 with the friction ring 23. Even if the spring 35 were to break, the device would still be fail safe in that the blade would not rotate unless the operator is holding the lever which pulls on the cable 40.

Figure 3:
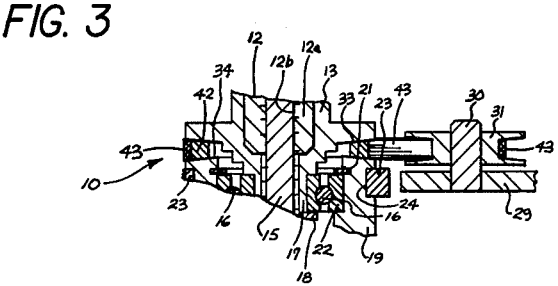

Referring now to an alternate embodiment shown in FIG. 3, it is noted that this embodiment is identical to the embodiment of FIGS. 1 and 2 except that instead of using a belt 32, a friction band 42 extends around and is loosely in contact with the surfaces 33 and 34 respectively of the members 13 and 19. A flat belt 43 extends around the idler pulley 31. Consequently, when the arm 29 is in the position shown in dashed lines in FIG. 1 then the members 13 and 19 will be free to rotate with respect to one another because there would not be enough friction between the member 42 and the surfaces 33 and 34 of the members 13 and 19 respectively. However, once the control arm 29 is moved to the position shown in solid lines in FIG. 1, then the belt 43 would exert enough pressure on one side of the friction band 42 that it would cause enough frictional contact between the friction bank 42 and the surfaces 33 and 34 to cause the member 19 to rotate with the member 13.

Obviously, many modifications and variations of the present invention are possible in light of the above teachings. It is therefore to be understood that, within the scope of the appended claims, the invention may be practiced otherwise than as specifically described.

I claim:

1. A clutch mechanism for a rotary mower comprising:
   a first circular member having a pair of tapered circular surfaces thereon being rigidly attached to a drive shaft;
   a second circular member having a pair of tapered circular surfaces thereon being rotatably journaled to said first circular member;
   a mower blade rigidly attached to said second circular member;
   means for selectively frictionally engaging the first and second circular members in a first position thereof for substantially preventing rotation of one of said circular members with respect to the other of said circular member and moveable to a second position for allowing said circular members to rotate with respect to each other, said engaging means including a ring disposed around said first and second circular members and loosely abutting said tapered circular surfaces, a belt disposed around said ring, whereby a relatively small amount of energy will be required to engage and disengage said first and second circular members with respect to each other; and
   means for controlling the movement of the engaging means between said first and second positions, said controlling means includes biasing means for biasing the engaging means into the second position thereof whereby said blade will be disengaged from turning with said drive shaft thereby providing a fail-safe function, said controlling means further including a pulley means for engagement with said belt and means for moving said pulley means to selectively tighten or loosen said belt whereby when said belt is tight against said ring said first and second circular members will turn together so as to transmit rotation from the drive shaft to said blade and when belt is loose, said blade will not be turned by said drive shaft.

2. A clutch mechanism as defined in claim 1 wherein said moving means comprises an arm pivotally attached to a lawn mower and having said pulley means rotatably attached thereto.

3. A clutch mechanism as defined in claim 2 wherein said biasing means comprises a spring attached to said arm for biasing it in one pivotal direction, said controlling means further comprising a cable attached to said arm for pulling it in an opposite pivotal direction.

4. A mechanism as defined in claim 3 including brake means for stopping rotation of said circular member and said blade means with respect to said lawn mower.

* * * * *